United States Patent [19]
Friend

[11] Patent Number: 5,083,821
[45] Date of Patent: Jan. 28, 1992

[54] EXTREME TEMPERATURE THREAD SEALING METHOD AND APPARATUS

[75] Inventor: Alden E. Friend, Valencia, Calif.

[73] Assignee: ITT Corporation, New York, N.Y.

[21] Appl. No.: 622,889

[22] Filed: Dec. 5, 1990

[51] Int. Cl.$^5$ .............................................. F16L 15/00
[52] U.S. Cl. .................... 285/355; 285/333; 285/332.2; 285/392; 285/89; 285/910; 285/917; 277/236; 403/288
[58] Field of Search ............ 285/355, 333, 332.2, 285/910, 392, 89, 379, 342; 277/236; 403/288, 343

[56] References Cited
U.S. PATENT DOCUMENTS

| | | | |
|---|---|---|---|
| 1,334,306 | 3/1920 | Liberty | 403/343 X |
| 1,867,093 | 4/1930 | Pivoto | 285/333 X |
| 2,604,507 | 8/1945 | Tyson | 277/236 |
| 2,919,147 | 12/1959 | Nenzell | 285/89 |
| 3,177,782 | 4/1962 | Sampson | 403/288 |
| 3,356,391 | 1/1967 | Bailey | 285/355 X |

Primary Examiner—Randolph A. Reese
Assistant Examiner—Tim Aberle
Attorney, Agent, or Firm—Menotti J. Lombardi

[57] ABSTRACT

A two or three piece seal apparatus and method is described for providing a positive seal of threads in extreme temperature ranges up to 2000° F. for at least 20 minutes. A stainless steel compression/retaining nut is utilized in combination with a high temperature alloy ring or diamond-shaped seal to effect sealing of the threads.

5 Claims, 2 Drawing Sheets

EXTREME TEMPERATURE THREAD SEALING METHOD AND APPARATUS

CROSS REFERENCE TO RELATED APPLICATION

This application is related to U.S. Pat. No. 4,887,631, entitled "Fire Isolation Device", and assigned to the assignee of this application.

BACKGROUND OF THE INVENTION

This invention concerns seals designed to fit pipe or straight threads, and more particularly to seals that provide positive sealing of threads in extreme temperature environments.

Seals for pipe couplings are known from U.S. Pat. Nos.: 3,004,776 (Sebardt); 2,342,425 (Parker); 1,071,585 (Rossell); 2,343,235 (Bashark); 3,009,722 (Augustin); and 3,259,404 (Papenguth). These prior art arrangements use elastomer elements which are not suitable for the extreme temperature environments contemplated by the invention.

Other bushing, ring, and boss type sealing arrangements of the prior art are known from U.S. Pat. Nos.: 2,704,676 (Harding); 3,462,539 (Winston); 3,106,413 (Hamlin); 2,825,584 (Badger et al.); 2,199,647 (Mueller et al); and 3,756,628 (St. Clair).

A pipe or tube coupling device is described in U.S. Pat. No. 3,356,391 in which nuts are formed with an annular packing ring or gland which may be made of deformable metallic or plastic material. This prior art reference does not recognize the critical material requirements for effective thread sealing at the extreme temperature environments contemplated by the invention.

The purpose of the invention is to solve the problem of sealing threads at system pressures up to 3,000 psi and temperatures up to 2,000° F. for 20 minutes, as well as cryogenic ($-455°$ F.) temperatures.

SUMMARY OF THE INVENTION

An object of the invention is to provide a two or three piece thread sealing apparatus to withstand a 2,000° F. temperature environment for 20 minutes as well as being suitable for cryogenic ($-455°$ F.) temperature environments.

Another object of the invention is to provide a sealing method to ensure effective sealing using the apparatus according to the invention and without the requirement of special tooling.

According to the broader aspects of the invention, the apparatus consists of a threaded ring and a compression nut designed to interlock and compress the ring to effectively seal the total surfaces of the thread connections.

The method of the invention consists of installing the compression nut on the male thread of the connection a number of turns, threading the ring on the same male thread a lesser number of turns, inserting the male thread into the female threaded coupling and tightening the male and female coupling, and tightening the compression nut sufficiently to bottom the compression nut on the coupling or face thereof.

BRIEF DESCRIPTION OF THE DRAWINGS

Other objects and features of the invention will become apparent by reference to the following description taken in conjunction with the accompanying drawings in which.

DESCRIPTION OF THE PREFERRED EMBODIMENT

The sealing apparatus and method of the invention will effectively seal pipe and straight threads for zero fluid drop leak tight systems up to and including 3,000 psi, 4,500 PSIG proof and 7,500 PSIG min. burst at elevated temperatures of 2,000° F. for 20 minutes minimum. The inventive apparatus and method is also suitable for cryogenic ($-455°$ F.) temperature environments.

Figure 1A:
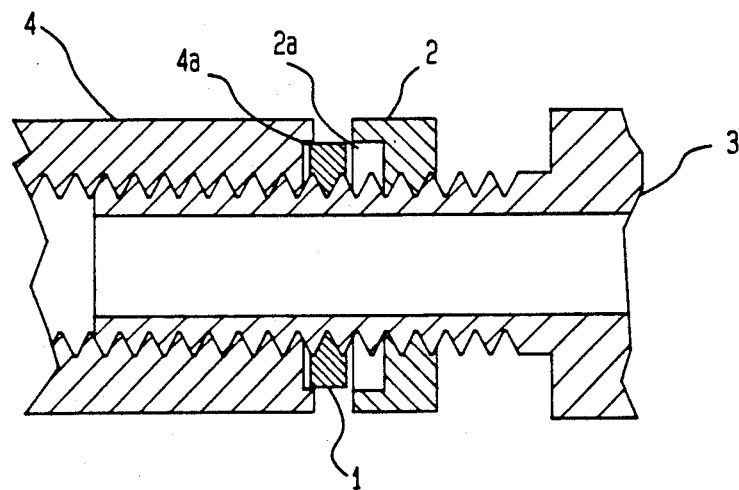
FIG. 1A illustrates the two piece sealing apparatus as installed.
Figure 1B:
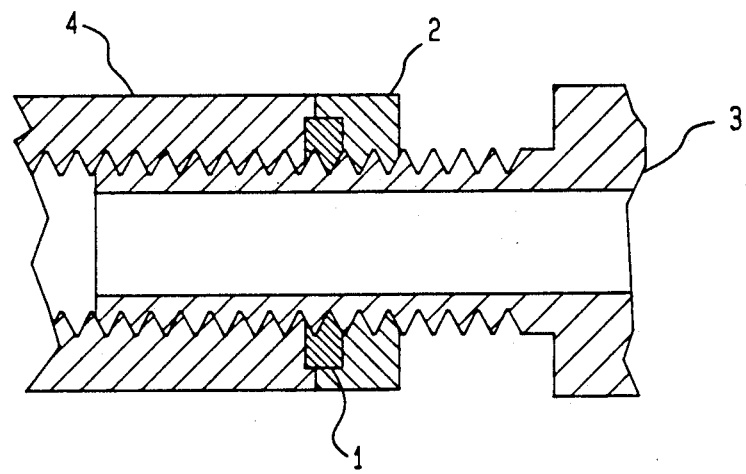
FIG. 1B illustrates the two piece sealing apparatus as torqued in place.

Referring now to FIG. 1A, there is shown a two piece sealing apparatus consisting of a high temperature alloy, such as red brass, manganese bronze, manganese silver bronze and the like, threaded ring seal 1, and a 316/316L stainless steel compression/retaining nut 2 having an undercut 2A to receive seal 1. The material is critical to effect sealing according to the invention. A male threaded fitting 3 is threaded into a female threaded coupling 4 also having an undercut (but female coupling need not be undercut) 4a to receive seal 1. FIG. 1B shows the apparatus of FIG. 1A torqued in-place in which the ring seal 1 and the nut 2 interlock and compress the ring seal to effectively seal the total surfaces of the threaded connections.

Figure 2:
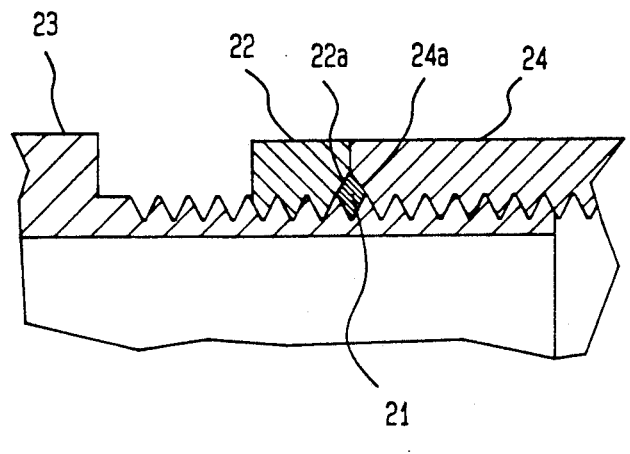
FIG. 2 illustrates another embodiment of the two piece sealing apparatus.

Referring now to FIG. 2, a diamond-shaped high temperature alloy ring seal 21 is shown with the nut 22 having a chamfered face 22A to accommodate the diamond-shaped seal 21. The female threaded coupling 24 for receiving the male threaded fitting 23 also has a chamfer 24a for the diamond-shaped seal.

The method of the invention for FIGS. 1 and 2 comprises installing the nut on the male thread of the connection and rotating the nut onto the thread at least seven thread turns. The ring or diamond-shaped seal is then threaded onto this same male thread and rotated approximately five thread turns or a couple less turns than the nut. No special tools are required for installation of the nut and seal, since they may be installed by hand using finger assembly. The threaded male fitting is then threaded into the female coupling in the normal manner and tightened some three turns plus or minus a half turn. The nut is then tightened sufficiently to bottom the nut against the female coupling or face thereof as shown in FIGS. 1B and 2. The torque applied to the nut is transmitted to the ring or diamond seal, and the seal is forced into the total threaded surface area including the thread root.

Figure 3A:
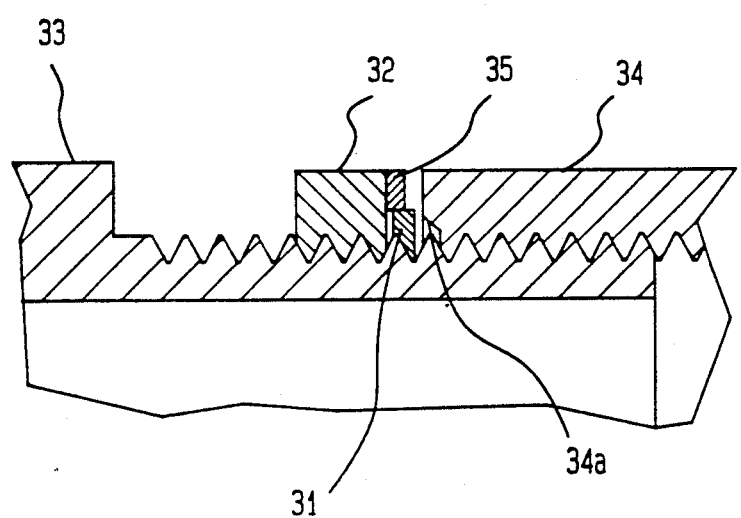
FIG. 3A illustrates the three piece sealing apparatus as installed.
Figure 3B:
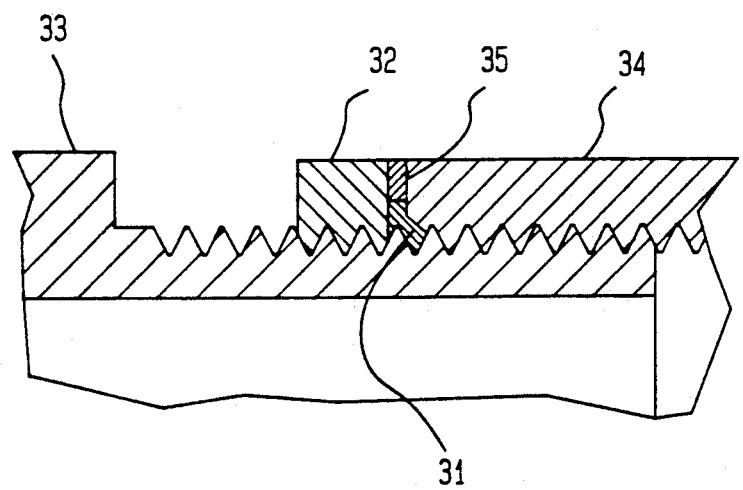
FIG. 3B illustrates the three piece sealing apparatus as torqued in place.

FIGS. 3A and 3B show respectively the three piece apparatus as installed and as torqued. The high temperature alloy ring seal 31 and the 316/316L stainless steel nut 32 are installed on male threaded fitting 33. Female threaded coupling 34 has a chamfer 34a and mounted on the outer diameter of ring seal 31 is a 316/316L stainless steel washer 35. The method of implementing the three piece arrangement is the same as for the two piece arrangement except that the washer is placed on the ring seal prior to insertion of the male thread into the female coupling.

The invention has particular application as a fire seal in that it is able to withstand 2,000° F. flame for up to 20 minutes without failure to meet fire safe connection requirements in fuel and hydraulic systems in aircraft, commercial and industrial heating and processing systems, and for fuel and hydraulic systems in automotive and naval equipments.

While the present invention has been disclosed in connection with the preferred embodiments thereof, it should be understood that there may be other embodiments which fall within the spirit and scope of the invention as defined by the following claims.

What is claimed is:

1. Sealing apparatus for sealing threads at temperatures up to 2,000° F. for at least 20 minutes comprising in combination:
    a male threaded fitting;
    a stainless steel nut with a chamfered face, threaded onto said fitting;
    a high temperature alloy seal with a rhombus-shaped cross-section threadedly mounted on said male fitting adjacent said chamfered face; and
    a threaded female coupling with a chamfered face engaging said male fitting up to said nut and seal, such that when said nut is tightened, the chamfered faces contact and compress said seal to effect the thread sealing.

2. The combination of claim 1 wherein said nut is made of 316 or 316L stainless steel, and said seal is made from a material selected from the group consisting of red brass, manganese bronze, or manganese silver bronze.

3. Sealing apparatus for sealing threads between a threaded male and a female coupling at extreme temperatures from −455° F. to 2,000° F. comprising in combination:
    a 316 internally threaded stainless steel nut being threaded on said male coupling and having an undercut said undercut including a radially outwardly extending surface and a tapered surface, said tapered surface extending toward said seal from said radially outwardly extending surface;
    a red brass ring seal being threaded on said male coupling adjacent said undercut and a stainless steel washer being mounted on the radially outer circumference of said seal; and
    said nut being tightened to compress said seal and cause said washer and seal to contact the adjacent face of said female coupling.

4. Sealing apparatus for sealing threads between a threaded male coupling and a female coupling having chamfered face at extreme temperatures from −455° F. to 2,000° F. comprising in combination:
    a 316 stainless steel nut with a chamfered face, threaded onto said fitting;
    a red brass seal with a rhombus-shaped cross-section threadedly mounted on said male coupling adjacent said chamfered face; and
    said nut is tightened so that the chamfered faces on said nut and female coupling contact and compress said seal to effect the threaded sealing.

5. Sealing method for a threaded male and a female coupling suitable for temperatures from −455° F. to 2,000° F. consisting of:
    threading a 316 or 316L stainless steel nut onto said male fitting a number of turns;
    installing a high temperature alloy made from a material selected from the group consisting of red brass, manganese bronze, or manganese silver bronze internally threaded ring seal on said male coupling by threading thereon a lesser number of turns than said nut;
    inserting said male coupling into said female coupling and tightening; and
    torquing said nut sufficiently to bottom against the female coupling face whereby the seal is forced into the threaded surface area to effect the thread sealing.

* * * * *